Sept. 9, 1969  E. T. GRABOWSKI  3,465,901
APPARATUS FOR LANDING OVERBOARD GEAR
Filed Nov. 20, 1967  2 Sheets-Sheet 2
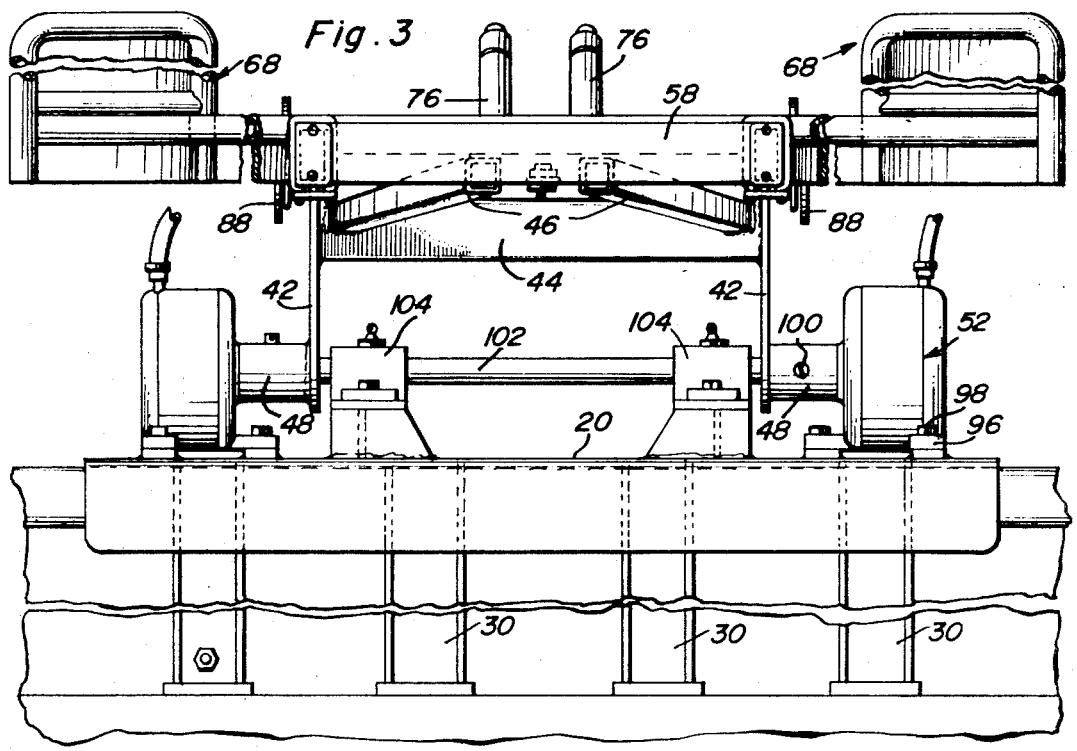
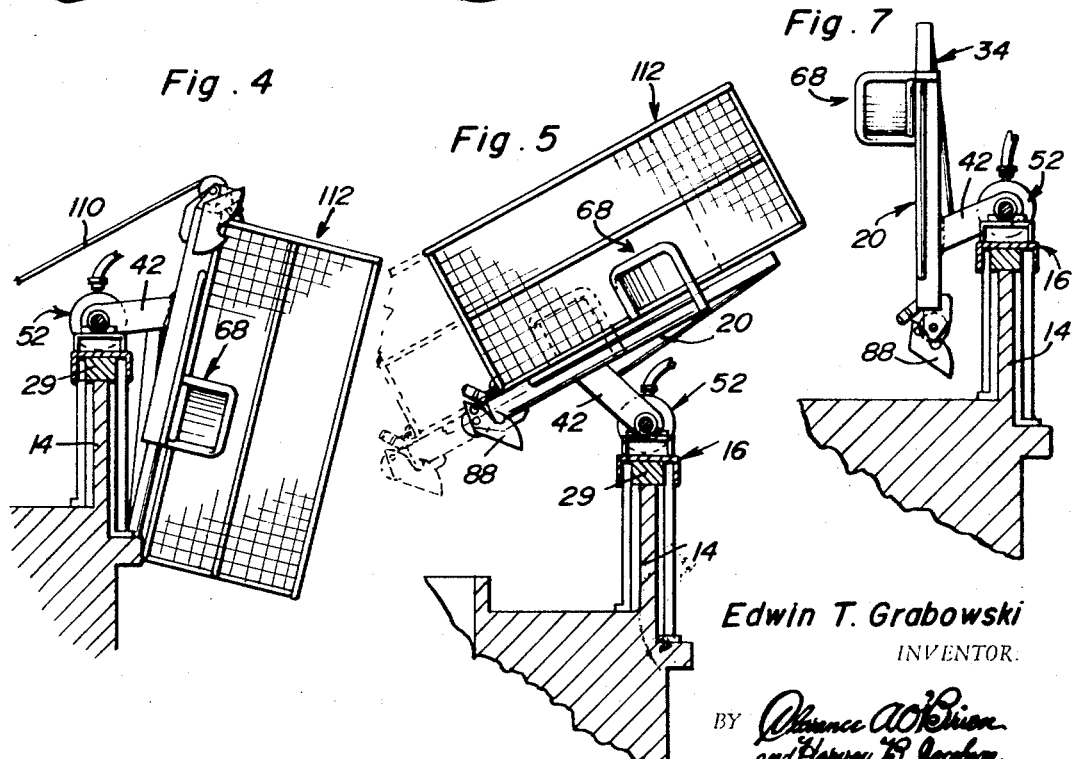
Edwin T. Grabowski
INVENTOR.

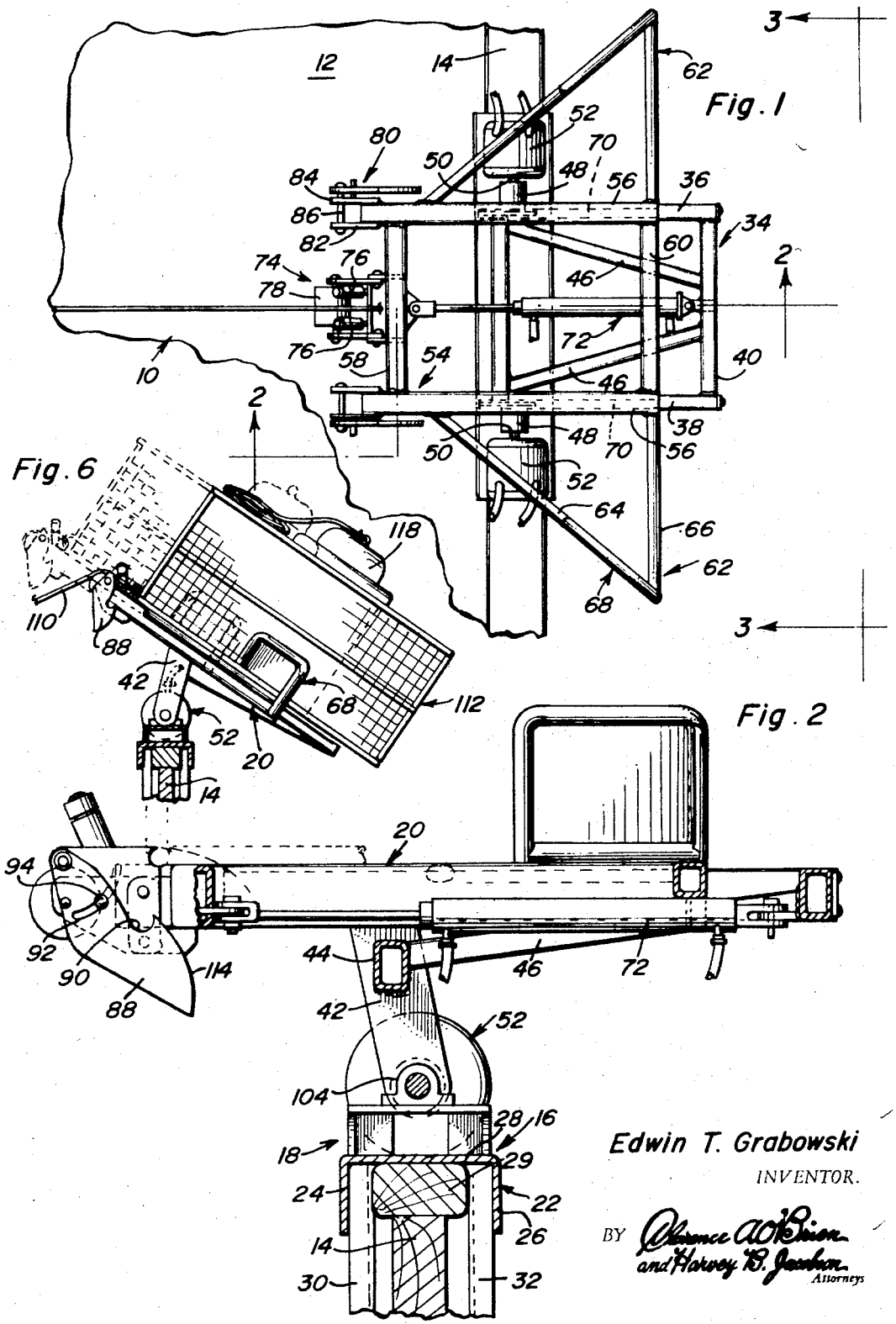

United States Patent Office 3,465,901
Patented Sept. 9, 1969

3,465,901
APPARATUS FOR LANDING OVERBOARD GEAR
Edwin T. Grabowski, 5666 Pleasure Point Lane,
Bellevue, Wash. 98004
Filed Nov. 20, 1967, Ser. No. 684,133
Int. Cl. B63b 27/00, 23/00
U.S. Cl. 214—15          7 Claims

ABSTRACT OF THE DISCLOSURE

An overboard gear engaging landing and inverting structure for support from a side or stern portion of a boat for swinging movement about a horizontal axis extending along that portion of the boat and also including means for engaging, releasably locking onto and fully supporting gear hoisted upwardly toward said structure from an overboard position, said structure, after engaging said gear, being thereafter swingable upwardly and inwardly of said boat portion in a manner to invert and inwardly displace the gear supported thereby.

---

The apparatus of the instant invention has been primarily designed for use as a means for quickly landing, unloading and resetting crab pots. The apparatus is supported from the associated boat for oscillation about a horizontal axis between an upstanding overboard position and an inboard position rotated approximately 180° from the overboard position. The apparatus includes means by which an overboard crab pot being hoisted thereto may be engaged by the apparatus and fully supported therefrom while the crab pot is disposed in an overboard position. Then, the apparatus may be oscillated approximately 180° to its inboard inverted position in which the crab pot will be supported in an inverted dumping position whereby the crabs may be readily dumped therefrom.

After the apparatus of the instant invention has been utilized to land and invert a crab pot, it may then be used to oscillate the associated crab pot toward a generally horizontal position between the full inboard and full outboard positions in which the associated crab pot may be prepared for resetting after which the apparatus is swung toward the initial overboard position for free release and gravity discharge of the associated crab pot therefrom over the side of the associated vessel.

The main object of this invention is to provide an apparatus which will efficiently handle and guidingly support crab pots during their movement from overboard positions to inboard positions.

Another object of this invention, in accordance with the immediately preceding object, is to provide an apparatus which will automatically oscillate an associated crab pot approximately 180° during its movement from an overboard position to an inboard position thereby supporting the crab pot in a dumping position in which the crabs therein may be readily dumped therefrom.

Still another object of this invention is to provide a crab pot handling and landing apparatus or structure which will reduce by two the number of men required to land a crab pot aboard a vessel with the crab pot supported in an inverted dumping position. The structure of the instant invention eliminating the need for two men to steady the crab pot inasmuch as the structure of the instant invention includes means for locking onto and guiding an associated crab pot from its overboard position to its inboard position.

A final object of this invention to be specifically enumerated herein is to provide an apparatus for landing overboard gear which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the apparatus of the instant invention illustrated mounted on the side of a vessel;

FIGURE 2 is an enlarged vertical sectional view taken substantially upon the plane indicated by the section line 2—2 of FIGURE 1;

FIGURE 3 is an enlarged elevational view taken substantially upon the plane indicated by the section line 3—3 of FIGURE 1 and with portions of the structure broken away and illustrated in section; and FIGURES 4–7 are elevational views illustrating the structure in crab pot engaging, dumping and resetting positions as well as a stowed position of the structure.

Referring now more specifically to the drawings, the numeral 10 generally designates a vessel including a deck portion 12 having an upstanding railing 14 extending along one side marginal edge portion thereof.

The apparatus is generally referred to by the reference numeral 16 and includes a pivot mount referred to in general by the reference numeral 18 and oscillatable support arm means generally referred to by the reference numeral 20. The pivot mount 18 includes an inverted channel-shaped member 22 including upstanding flange portions 24 and 26 interconnected at their upper ends by means of a bight portion 28 and the inverted channel-shaped member 22 is positioned over the railing 14 with the bight portion 28 resting upon the top rail 29 of the railing 14 and the flanges or flange portions 24 and 26 spaced laterally of opposite sides of the top rail 29 and embracingly receiving the latter therebetween. A plurality of opposite side upstanding brace members 30 and 32 may be provided and conveniently secured between opposite side portions of the bight portion 28, the corresponding flanges 24 and 26 and portions of the deck 12 disposed beneath the inverted channel-shaped member 22 in any convenient manner. Of course, if the railing 14 is not present, any suitable standard secured to the deck 12 and having the inverted channel-shaped member 22 mounted on the upper end thereof may be utilized to properly mount the channel-shaped member 22 in the desired position.

The support arm means 20 includes an inner frame referred to in general by the reference numeral 34 consisting of a pair of opposite side members 36 and 38 interconnected at one pair of corresponding ends by means of a transverse brace member 40. A pair of depending plate-like arms project laterally from the other pair of corresponding ends of the opposite side members 36 and 38 and are interconnected intermediate their opposite ends by means of a second transverse brace member 44. Additionally, a pair of inclined brace members 46 are secured between opposite end portions of the transverse brace member 44 and the transverse brace member 40 at points spaced slightly on opposite sides of the center of the transverse brace member 40. The free ends of the arms 42 have oppositely laterally projecting sleeve members 48 mounted thereon and the sleeve members are telescoped onto the confronting end portions of the output shafts 50 of a pair of fluid motors 52 mounted on the inverted channel-shaped member 22. Accordingly, it may be seen that the inner frame 34 may be oscillated about the pivot axis defined by the output shafts 50 upon actuation of the fluid motors 52 which are reversible.

The support arm means 20 also includes an outer or main frame referred to in general by the reference numeral 54 consisting of a pair of tubular opposite side members 56 interconnected at one pair of corresponding ends by means of a transverse brace member 58 and at the other pair of corresponding ends by means of a transverse brace member 60. The outer or main frame 54 also includes a pair of opposite side wing structures referred to in geneal by the reference numerals 62 and which include a pair of arm members 64 projecting outwardly from the ends of the opposite side members 56 adjacent the transverse member 58 and divergent toward the transverse brace member 60. The free ends of the arm members 64 are braced from the ends of the opposite side members 56 by means of transverse brace members 66 extending outwardly from the ends of the opposite side members 56 adjacent the transverse member 60 and secured to the free ends of the arm members 64 at their remote ends. The arm members 64 each includes a laterally projecting deflecting plate structure referred to in general by the reference numeral 68.

The opposite side members 56 are longitudinally slotted as at 70 and the ends of the opposite side members 36 and 38 are telescoped into the opposite side members 56 with the arms 42 being slidingly received in the slots 70. A double-acting extendible hydraulic cylinder generally referred to by the reference numeral 72 is provided and connected between the transverse brace member 40 and the transverse brace member 58 whereby the outer or main frame 54 may be extended and retracted relative to the inner frame 34.

A cable guide structure generally referred to by the reference numeral 74 is supported from the transvese brace member 58 and includes a pair of opposite side rollers 76 and a transverse roller 78. The cable guide assembly 74 is adapted to have a cable pass over the roller 78 and between the rollers 76. Further, the ends of the opposite side members 56 adjacent the transverse member 58 are each provided with a latch structure referred to in general by the reference numeral 80 and each latch structure 80 includes a pair of opposite side plates 82 and 84 secured to and projecting endwise outwardly from the adjacent end of the corresponding side member 56. A pivot pin 86 extends between each pair of plates 82 and 84 and a latching member 88 is pivotally secured on each pivot pin 86 and includes a hook-shaped notch 90. In addition, each latch member 88 includes an arcuate slot 92 having the corresponding pivot pin 86 as its center of curvature and a stop pin 94 carried by the corresponding plate 84 and projecting laterally outwardly therefrom is slidingly received through each slot 92 whereby oscillation of the latch members 88 is limited.

With attention now invited more specifically to FIGURE 3 of the drawings it may be seen that each of the fluid motors 52 is provided with a mounting base 96 and that each mounting base 96 is secured to the bight portion 20 by means of a plurality of fasteners 98. In addition, it may be seen that each of the sleeves 48 includes a setscrew 100 whereby it may be secured to the output shafts 50 of the motors 52. Further, it may also be seen that a shaft portion 102 extends between the sleeves 48 and is journaled through a pair of journal blocks 104 also suitably secured to the bight portion 20.

In operation, the frames 34 and 54 comprising the support arm means 20 may be, when not in use, pivoted, by means of the motors 52, to the stowed position illustrated in FIGURE 7 of the drawings wherein docking of the vessel 10 is not hindered.

When it is desired to land a crab pot, the support arm means 20 is then pivoted to the pick-up position illustrated in FIGURE 4 of the drawings with the outer or main frame 34 retracted relative to the inner frame 34. Then, with a winch cable 110 passing over the roller 78 and between the rollers 76, a crab pot generally referred to by the reference numeral 112 to which the free end of the cable 110 has been secured may be raised toward the support arm means 20 which is extendible according to the length of the crab pot 112 and is extended so as to position the crab pot 112 with its longitudinal center generally registered with the arms 42. As the crab pot 112 is drawn upwardly to the position thereof illustrated in FIGURE 4, the latch members 88 are swung to the left at their lower ends as viewed in FIGURE 4 of the drawings by contact of the lowermost bar of the crab pot 12 with the cam surfaces 114 on the latch members 88 until the lowermost bar on the crab pot 112 is registered with the notches 90 whereupon the latch members 88 swing to the right at their lower ends as viewed in FIGURE 4 of the drawings to seatingly position the lowermost bar of the crab pot 112 in the notches 90. Of course, the latch members 88 swing to the right at their lower ends by gravity and therefore the latching action of the latch members 88 on the crab pots 112 is fully automatic.

After the crab pot 112 has been raised and latched in the position illustrated in FIGURE 4 of the drawings, the hydraulic motors 52 may be actuated to swing the support arm means 20 over the railing 14 to the position thereof illustrated in FIGURE 5 of the drawings in which the then lowermost end of the crab pot 112 may be opened in order to dump the crabs therefrom. Thereafter, the support arm means 20 may be pivoted to the position thereof illustrated in FIGURE 2 of the drawings in which the crab pot 112 may be baited. Then, the support arm means may be pivoted to the position thereof illustrated in FIGURE 6 of the drawings with the buoy 118 and its line positioned on top of the crab pot 112. Thereafter, the crab pot 112 may be lowered back into the water by the cable 110. Of course, as the support arm means 20 is pivoted from the position thereof illustrated in FIGURE 4 of the drawings to the position thereof illustrated in FIGURE 5 of the drawings the weight of the crab pot 112 is taken from the latch members 88 and therefore the latter are free to pivot toward the unlatched positions illustrated in FIGURES 2, 5 and 6 of the drawings preparatory to lowering the crab pot 112 back into the water after unloading the crabs therefrom, baiting and resetting the crab pot 112.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. An apparatus for landing overboard gear such as crab pots, said apparatus elongated support arm means including first and second ends, pivot mount means defining a generally horizontal pivot axis and adapted to be supported from one edge portion of a vessel with said axis extending along said edge portion, said arm means being oscillatably supported from said pivot mount means for oscillation about said axis and with the latter extending transversely of said arm means intermediate its opposite ends, said arm means being swingable in opposite directions past an intermediate generally horizontal position with one side thereof facing upwardly toward two upstanding limit positions in which opposite ends of said arm means are disposed lowermost, latch means carried by one end of said support arm means, said latch means being operative by gravity, when said support arm means is disposed generally upright with said one end uppermost, for automatically releasably engaging and supporting the uper end of a crab pot pulled from the water upwardly along said support arm means and to automatically release said crab pot for subsequent downward sliding movement into the water upon said arm means being pivoted toward a position with the other end uppermost and said crab pot being subsequently shifted further toward said one end of said support arm means prior to the latter again being pivoted to an upstanding position with said one end disposed uppermost.

2. The combination of claim 1 wherein said arm means includes an arm structure projecting outwardly of the side thereof remote from said one side of said arm means and including an outer free terminal end portion, said axis extending transversely of the free end portion of said arm structure, whereby said arm means is positionable in spaced apart upstanding planes when swung to said limit positions and said mount means may be disposed so as to position said axis vertically spaced above the side or railing of said vessel and said support arm means may be positioned on opposite sides of said railing when in said limit positions and swung over said railing when pivoted from one limit position to the other.

3. The combination of claim 1 wherein said support arm means includes flexible tension member guide means on one end thereof adapted to guide an elongated flexible tension member for guided longitudinal shifting of the latter relative to said guide means.

4. The combination of claim 1 including drive means operatively connected between said pivot mount means and said support arm means for selectively oscillating the latter relative to said pivot mount means.

5. The combination of claim 1 wherein said support arm means includes guide means at a first end thereof adapted to funnel a crab pot being advanced toward said first end into a transversely centered position as said crab pot is pulled onto said support arm means from said first end thereof.

6. The combination of claim 5 wherein said support arm means includes tension member guide means on the second end thereof adapted to guide an elongated flexible tension member for guided longitudinal shifting of the latter relative to said guide means.

7. The combination of claim 1 wherein said support arm means includes realtively extendable opposite end portions, and means operatively connected between said opposite end portions for relatively extending and retracting the latter.

References Cited

UNITED STATES PATENTS

| | | | |
|---|---|---|---|
| 2,417,121 | 3/1947 | Nelson | 214—317 XR |
| 528,753 | 11/1894 | Wright | 214—104 |
| 1,487,076 | 3/1924 | Pilley | 214—314 |
| 3,303,945 | 2/1967 | Hubbard et al. | 214—15 |

FOREIGN PATENTS

| | | |
|---|---|---|
| 115,722 | 1/1930 | Austria. |
| 987,048 | 3/1965 | Great Britain. |

GERALD M. FORLENZA, Primary Examiner

F. E. WERNER, Assistant Examiner

U.S. Cl. X.R.

9—39; 214—314, 104